United States Patent [19]
Podvigalkina

[11] 3,880,632
[45] Apr. 29, 1975

[54] METHOD OF JOINING OPTICAL GLASS PARTS

[76] Inventor: Galina Yakovlevna Podvigalkina, ulitsa Klubnaya, 22a, kv. 26, Kazan, U.S.S.R.

[22] Filed: Aug. 30, 1973

[21] Appl. No.: 393,204

[52] U.S. Cl. .......................... 65/37; 65/42; 65/43
[51] Int. Cl. ............................................ C03b 23/22
[58] Field of Search .............. 65/18, 36, 37, 42, 43; 423/336, 337

[56] References Cited
UNITED STATES PATENTS

| | | |
|---|---|---|
| 2,326,059 | 8/1943 | Nordberg .......................... 65/18 X |
| 2,382,660 | 8/1945 | Penberthy .......................... 65/37 X |
| 2,918,757 | 12/1959 | Francl .............................. 65/43 X |
| 3,210,171 | 10/1965 | MacDonald .......................... 65/43 |
| 3,217,088 | 11/1965 | Steierman .......................... 65/43 X |

Primary Examiner—Robert L. Lindsay, Jr.
Attorney, Agent, or Firm—Holman & Stern

[57] ABSTRACT

A method of joining optical glass parts consisting in that the flat surfaces of the optical glass parts to be joined are polished to an accuracy of 0.5 interference fringe, thereafter a binding layer of silica ($SiO_2$) is applied to one of the surfaces to be joined, and the optical glass parts are joined by optical contact and exposed to infrared radiation.

6 Claims, 4 Drawing Figures

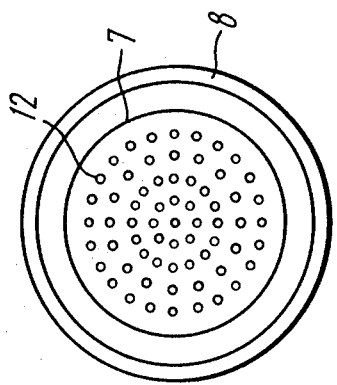
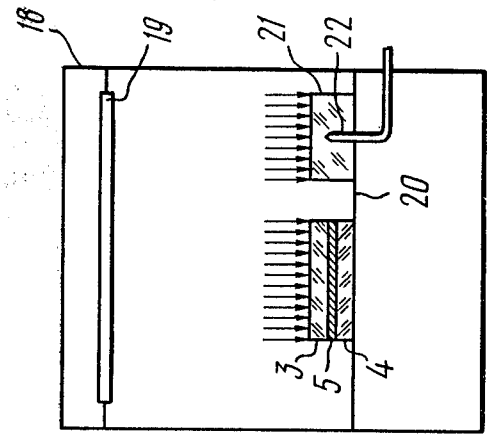
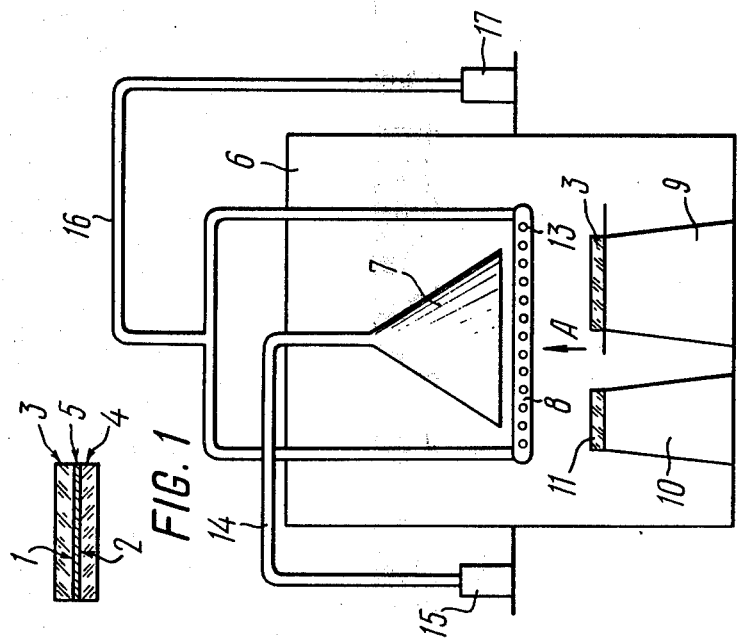

METHOD OF JOINING OPTICAL GLASS PARTS

BACKGROUND OF THE INVENTION

The present invention relates to the manufacture of optical glass articles made of two or more optical glass parts, and more particularly to a method of joining optical glass parts.

The necessity of joining optical glass parts arises in the manufacture of optical glass articles of complex configuration when it is impossible, for technological reasons, to make them from a solid optical blank, or when, according to the requirements imposed thereon, they have to be made from separate optical glass parts. This is particularly true for various optical cells.

Optical glass articles made of separate optical glass parts should most commonly meet the same requirements usually imposed on those made from solid optical blanks.

A method of joining optical glass parts is known, wherein a multicomponent optical glass article may be made by joining separate optical glass parts with special adhesives. However, the optical articles thus made are unsuitable for use in aggressive media, under high vacuum and when exposed to intense radiation.

Another method of joining optical glass parts is known, whereby the surfaces to be joined are fused with each other to form durable optical glass articles stable to aggressive media.

A disadvantage of this method is distortion of the optical glass parts being joined.

Also known in the art is a method of fusing optical glass plates, specifically in the manufacture of precision optical cells, to form mechanically strong joints, stable to aggressive media, without any distortions. The method consists in that placed between the specially prepared surfaces to be joined is a binding layer of frit, which layer is then irradiated through one of the plates with a highly intense light beam of a wavelength at which the frit possesses high optical absorptivity and the optical glass plates possess high optical transmission, as a result of which the frit layer melts and the optical glass plate surfaces are fused.

The above method is limited in application because the joining of the glass plates is due to the melting of the binding frit layer and the softening of the surfaces being joined, which, naturally, results in distortion of the adjacent surfaces. Articles produced by this method may only be used in cases when the joints between the glass plates are not the active working optical medium.

In other words, optical glass articles made by this method can be used in optical devices only when the adjoining surfaces and the frit layer therebetween are parallel to the light flux. Besides, this method is only applicable for joining plates made from a high-melting and heat-resistant material, such as quartz.

SUMMARY OF THE INVENTION

It is an object of the present invention to obviate the above disadvantages.

Accordingly, it is a principal object of the present invention to provide a method of joining optical glass parts to form solid optical glass articles without altering the original characteristics of the optical glass parts being joined.

This object is attained in a method of joining optical glass parts with flat surfaces to be joined, by placing a binding layer therebetween and exposing said optical glass parts to infrared radiation, wherein, according to the invention, the surfaces to be joined are polished to an accuracy of no less than 0.5 interference fringe, a binding layer in the form of a film of silica ($SiO_2$) is applied to at least one surface to be joined, thereafter the optical glass parts are joined by optical contact, then exposed to infrared radiation of a gradually increasing density.

It is expedient that the film of silica ($SiO_2$) be applied by hydrolyzing vapors of silicon tetrachloride ($SiCl_4$) in an apparatus comprising an airtight chamber housing a water-vapor diffuser of a tapered shape with its bottom having holes to let water vapors out and a diffuser of silicon tetrachloride ($SiCl_4$) made in the form of an annular pipe surrounding the tapered water-vapor diffuser and provided with through holes in a plane parallel to that of the bottom of the former diffuser.

It is preferable that in the case where the optical glass parts to be joined are made from silicate glass, the film of silica ($SiO_2$) be applied by etching the optical glass parts in an acid after they have been treated in an aqueous-alkaline solution.

The thickness of the film of silica ($SiO_2$) should preferably be from 1,000 to 2,000 A.

It is advisable that when the optical glass parts being joined are exposed to infrared radiation, they be heated to a temperature of 150° to 250°C.

It is also expedient to use infrared emitters with their radiative energy maximum being in the energy range of optical radiation of the optical glass parts being joined.

The proposed method makes it possible to produce solid optical articles without impairing the shape and quality of the surfaces of the optical elements being joined, made from various optical materials: colored and colorless optical glass, optical quartz glass, glass-ceramic, silicon and germanium.

BRIEF DESCRIPTION OF THE DRAWING

Other objects and advantages of the invention will become apparent from the detailed description which follows when taken in conjunction with the accompanying drawings, in which:

FIG. 1 shows the mutual arrangement of the optical glass parts to be joined and the binding layer, according to the invention;

FIG. 2 shows schematically an apparatus for applying a binding layer ($SiO_2$) on the flat surfaces of the optical glass parts to be joined, by hydrolyzing vapors of silicon tetrachloride ($SiCl_4$), according to the invention;

FIG. 3 is a view of the water-vapor diffuser and the diffuser of vapors of silicon tetrachloride ($SiCl_4$) of the apparatus of FIG. 2, taken in the direction of arrow A;

FIG. 4 shows schematically an apparatus for irradiating the optical glass parts being joined with an infrared light beam, as well as the arrangement therein of the optical glass parts being joined, according to the invention.

DETAILED DESCRIPTION OF PREFERRED EMBODIMENTS

Referring now to the drawings, flat surfaces 1 and 2 (FIG. 1) of optical glass parts 3 and 4 to be joined are polished to an accuracy of no less than 0.5 interference fringe, prior to applying thereto a binding layer 5 of silica ($SiO_2$).

The polishing of the surfaces 1 and 2 of the optical glass parts 3 and 4 to be joined to the above accuracy is required to join these surfaces by optical contact.

The binding layer 5 of silica ($SiO_2$) is applied to any one of the polished surfaces 1 or 2 of the optical glass parts 3 or 4. The binding layer 5 of silica ($SiO_2$) should preferably be applied by hydrolyzing vapors of silicon tetrachloride ($SiCl_4$) in the apparatus shown in FIG. 2.

The apparatus comprises an airtight chamber 6 housing water-vapor diffuser 7 and a diffuser 8 of vapors of silicon tetrachloride, a supporting member 9 for the optical glass parts being joined whereto the binding layer is to be applied and a supporting member 10 for a standard specimen 11. The water-vapor diffuser is tapered with its bottom in the wider portion thereof. The bottom is provided with holes 12 (FIG. 3) to let out water vapors and faces the supporting members 9 and 10 (FIG. 2).

The diffuser 8 of silicon tetrachloride is made in the form of an annular pipe surrounding the water-vapor diffuser 7 and has through holes 13 in a plane parallel to the bottom of the diffuser 7.

The water-vapor diffuser 7 is connected to a vessel 15 filled with water, through a pipe 14.

The diffuser 8 of silicon tetrachloride is connected to a vessel 17 filled with silicon tetrachloride, through a pipe 16.

Prior to the application of the binding layer 5 of silica ($SiO_2$) (FIG. 1) by way of hydrolysis of silicon tetrachloride ($SiCl_4$) vapors, any one of the optical glass parts to be joined, for example, the optical glass part 3, is placed on the supporting member 9 inside the airtight chamber 6.

Compressed air is fed to the vessel 15 with water and vessel 17 with silicon tetrachloride. The air saturated with vapors of water and silicon tetrachloride is delivered through pipes 14 and 16, respectively, and diffusers 7 and 8 to the airtight chamber 6. Vapors of water ($H_2O$) and silicon tetrachloride ($SiCl_4$) are hydrolyzed forming orthosilicic acid / $Si(OH)_4$ in a dispersed state. By gradually giving up water and being adsorbed, it forms on the surface of the optical glass part 3 a fast binding layer 5 of silica ($SiO_2$) (FIG. 1). Placed on the supporting member 10 (FIG. 2) level with the optical glass part 3 is a standard specimen 11 used to control the thickness of the binding layer 5 of silica ($SiO_2$) (FIG. 1) being applied.

The thickness of the binding layer is controlled by any appropriate known method, for example, by photometry.

Depending on the material from which the optical glass parts 3 and 4 are made, as well as their sizes, the thickness of the binding layer 5 may vary from 1,000 to 2,000 A.

In each particular case, the thickness of the binding layer 5 is determined by way of experimentation.

When the optical glass parts 3 and 4 are made from silicate glass, they should preferably be coated with the binding layer 5 of silica ($SiO_2$) which is applied thereto by way of etching one of the optical glass parts 3 or 4 in acids, for example, in nitric acid ($HNO_3$) or acetic acid ($CH_3COOH$) using any appropriate technique.

In this case, prior to etching, the optical glass parts are treated with a seminormal solution of sodium hydrate (20 g of NaOH per liter of water).

As already mentioned above, the binding layer 5 of silica ($SiO_2$) may be applied either to any one of the optical glass parts 3 or 4 to be joined or to both.

Once the binding layer 5 of silica ($SiO_2$) has been applied to the optical glass parts 3 and/or 4, they are cleaned with dehydrated alcohol, brought close together and slightly pressed against each other to be joined by optical contact.

The optical glass parts 3 and 4 thus joined are placed in an airtight chamber 18 (FIG. 4) housing an infrared emitter 19, a supporting member 20 and a standard specimen 21 incorporating a thermocouple 22. The joined optical glass parts 3 and 4 are adjusted on the supporting member 20 also placed whereon is the standard specimen 21 incorporating the thermocouple 22 for controlling the temperature of heating of the joined optical glass parts 3 and 4. The optical glass parts 3 and 4 are exposed to infrared radiation of a gradually increasing density with the maximum heating temperature being maintained, depending on the material and size of the optical glass parts 3 and 4, within a range of 150° to 250°C.

The heating time and temperature of the joined optical glass parts 3 and 4 are determined in each particular case experimentally.

Gradual increase in the density of the infrared radiation, hence in the heating temperature, is achieved by varying the supply voltage of the infrared emitters 19. The joined optical glass parts 3 and 4 are removed from the airtight chamber 18 only after they have completely cooled down.

The optical glass articles thus made are stable to all possible actions that may eventually be exerted thereon in the course of operation, such as mechanical loads, aggressive media, intense radiation, etc, within the limits of stability of the optical glass parts proper, and the interface of the joined optical glass parts does not affect in the least their optical characteristics. The herein-disclosed method may be used in the manufacture of precision optical cells, optical filters, optical mirrors and the like.

What is claimed is:

1. A method of joining optical glass parts, comprising the steps of: polishing the flat surfaces of optical glass parts to be joined to an accuracy of no less than 0.5 interference fringe; applying a binding layer in the form of a film of silica to at least one of said surfaces of said optical glass parts to be joined; joining said optical glass parts by optical contact and exposing them to infrared radiation of a gradually increasing density.

2. The method as claimed in claim 1, wherein said film of silica is applied by hydrolyzing vapors of silicon tetrachloride in an apparatus comprising an airtight chamber; a water-vapor diffuser disposed in said chamber and having a tapered shape with its bottom being provided with holes for letting water vapors out; a diffuser of silicon tetrachloride also disposed in said chamber and made in the form of an annular pipe surrounding said water-vapor diffuser, with through holes in a plane parallel to that of said bottom of said water-vapor diffuser.

3. The method as claimed in claim 1, wherein said optical glass parts to be joined are made from silicate glass, and said film of silica is applied thereto by etching said optical glass parts in an acid after they have been treated in an aqueous-alkaline solution.

4. The method as claimed in claim 1, wherein the thickness of said film of silica applied to said optical glass parts is from 1,000 to 2,000 A.

5. The method as claimed in claim 1, wherein said optical glass parts are exposed to said infrared radiation after they have been joined to heat them to a temperature of 150° to 250°C.

6. The method as claimed in claim 1, wherein use is made of infrared emitters with their infrared radiation energy maximum being in the energy range of optical radiation of said joined optical glass parts.

* * * * *